US012690685B2

(12) United States Patent　　　　(10) Patent No.:　US 12,690,685 B2
　　Licea et al.　　　　　　　　　　　(45) Date of Patent:　　　Jul. 28, 2026

(54) HAIR SALON OR BARBER SHOP ACCESSORY TO SUPPORT VIDEO OR IMAGE RECORDERS ON BARBER OR SALON CHAIRS

(71) Applicants: Adrian Licea, Rancho Cucamonga, CA (US); Moses Heredia, Rancho Cucamonga, CA (US)

(72) Inventors: Adrian Licea, Rancho Cucamonga, CA (US); Moses Heredia, Rancho Cucamonga, CA (US)

( * ) Notice: Subject to any disclaimer, the term of this patent is extended or adjusted under 35 U.S.C. 154(b) by 212 days.

(21) Appl. No.: 18/589,631

(22) Filed: Feb. 28, 2024

(65) Prior Publication Data

US 2025/0268378 A1　　Aug. 28, 2025

(51) Int. Cl.
　　*A47C 1/11*　　　　　(2006.01)
　　*G03B 17/56*　　　　(2021.01)
　　*H04M 1/04*　　　　(2006.01)
(52) U.S. Cl.
　　CPC .............. *A47C 1/11* (2013.01); *G03B 17/561* (2013.01); *H04M 1/04* (2013.01)
(58) Field of Classification Search
　　CPC .... A47C 1/04; A47C 1/06; A47C 1/08; A47C 1/10; A47C 1/11; G03B 17/562; H04M 1/04
　　USPC ............................................. 297/185, 188.21
　　See application file for complete search history.

(56) References Cited

U.S. PATENT DOCUMENTS

| | | | | |
|---|---|---|---|---|
| 4,136,908 | A | * 1/1979 | Crayne | A47C 1/11 297/188.21 |
| 6,123,306 | A | 9/2000 | Jackson | |
| 7,171,114 | B2 * | 1/2007 | Milton | H04N 7/183 396/419 |
| 7,232,265 | B1 | 6/2007 | Price | |
| 7,861,985 | B2 | 1/2011 | Galvin | |
| 10,702,067 | B2 | 7/2020 | Acevedo | |
| D908,164 | S | 1/2021 | Zhang | |
| 11,666,151 | B1 * | 6/2023 | Gadson | A47C 7/72 297/217.1 |
| 12,326,219 | B2 * | 6/2025 | Cai | F16M 11/041 |
| 2003/0042772 | A1 * | 3/2003 | Park | A61B 1/00048 297/217.1 |
| 2004/0211868 | A1 | 10/2004 | Holmes | |
| 2018/0110335 | A1 * | 4/2018 | O'Hagan | A47C 7/66 |

(Continued)

FOREIGN PATENT DOCUMENTS

| | | | | |
|---|---|---|---|---|
| KR | 20190111483 A | * | 10/2019 | A47B 23/00 |
| KR | 20200017892 A | * | 2/2020 | G03B 17/561 |
| WO | WO2004097515 | | 11/2004 | |

*Primary Examiner* — Milton Nelson, Jr.

(57) ABSTRACT
A video or image recorder support arrangement generally includes a horizontal arm structure, a vertical arm structure, a mounting structure, a connecting structure, and a holding arrangement. The mounting structure is designed to be detachably and rotatably connected to a support column of a commercial chair. The holding arrangement is designed to hold a video or image recorder. The horizontal arm structure extends essentially radially from the support column and permits the vertical arm structure to be freely moved about the chair to permit a user to record video or images of the head of a customer or of a commercial process performed by the user in a hands-free manner and from different angles or viewpoints.

10 Claims, 6 Drawing Sheets

(56)     References Cited

U.S. PATENT DOCUMENTS

2020/0121089 A1\*   4/2020  Rucci ..................... A47C 7/541
2021/0145178 A1\*   5/2021  Riley ................. A47C 1/03222

\* cited by examiner

HAIR SALON OR BARBER SHOP ACCESSORY TO SUPPORT VIDEO OR IMAGE RECORDERS ON BARBER OR SALON CHAIRS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to hair salon or barber shop accessories and more particularly pertains to a new video or image recorder support arrangement for commercial chairs, such as salon chairs or barber chairs, having a support column. Sometimes barbers or hair stylists wish to record video or images of their work, but unfortunately their hands are occupied, thus making it impossible to both record videos and images and do their work at the same time. Such is also true for other professions that utilize chairs, such as medical and dental professionals, tattoo artists, and makeup artists. It would therefore be beneficial to have a support arrangement that allows for recording video and images of the customer in the chair as well as the work process being performed by the professional.

(2) Description of Related Art Including Information Disclosed Under 37 CFR 1.97 and 1.98

The prior art relates to hair salon or barber shop accessories. The prior art, as best understood, does not disclose a video or image recorder support arrangement that has an arm arrangement connected to a commercial chair, such as a barber chair or a salon chair, that is rotatable around the chair.

BRIEF SUMMARY OF THE INVENTION

An embodiment of the disclosure meets the needs presented above in a video or image recorder support arrangement generally comprising a horizontal arm structure, a vertical arm structure, a mounting structure, a connecting structure, and a holding arrangement. The horizontal arm structure includes a first horizontal end portion and a second horizontal end portion. The vertical arm structure includes a first vertical end portion and a second vertical end portion. The mounting structure is positioned at the first horizontal end portion and is designed to be detachably and rotatably connected to a support column of a commercial chair. The connecting structure is designed and positioned to connect the second horizontal end portion to the second vertical end portion such that the vertical arm structure extends upwardly from the horizontal arm structure upon connection to a commercial chair. The holding arrangement is positioned at the first vertical end portion and is designed to support and hold a video or image recorder. The vertical arm structure has a length sufficient to position the holding arrangement adjacent a headrest of a commercial chair to permit a user to record video or images of the head of a customer or of a commercial process performed by the user on the customer. The horizontal arm structure is positioned to extend essentially radially from a support column of a commercial chair and has a length sufficient to position the second horizontal end portion to project beyond a seat and backrest such that upon rotation of the mounting structure about a support column of a commercial chair the vertical arm structure is freely movable about a seat and a backrest of a commercial chair to permit a user to record video or images of the head of a customer or of a commercial process performed by the user on the customer from different angles or viewpoints.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
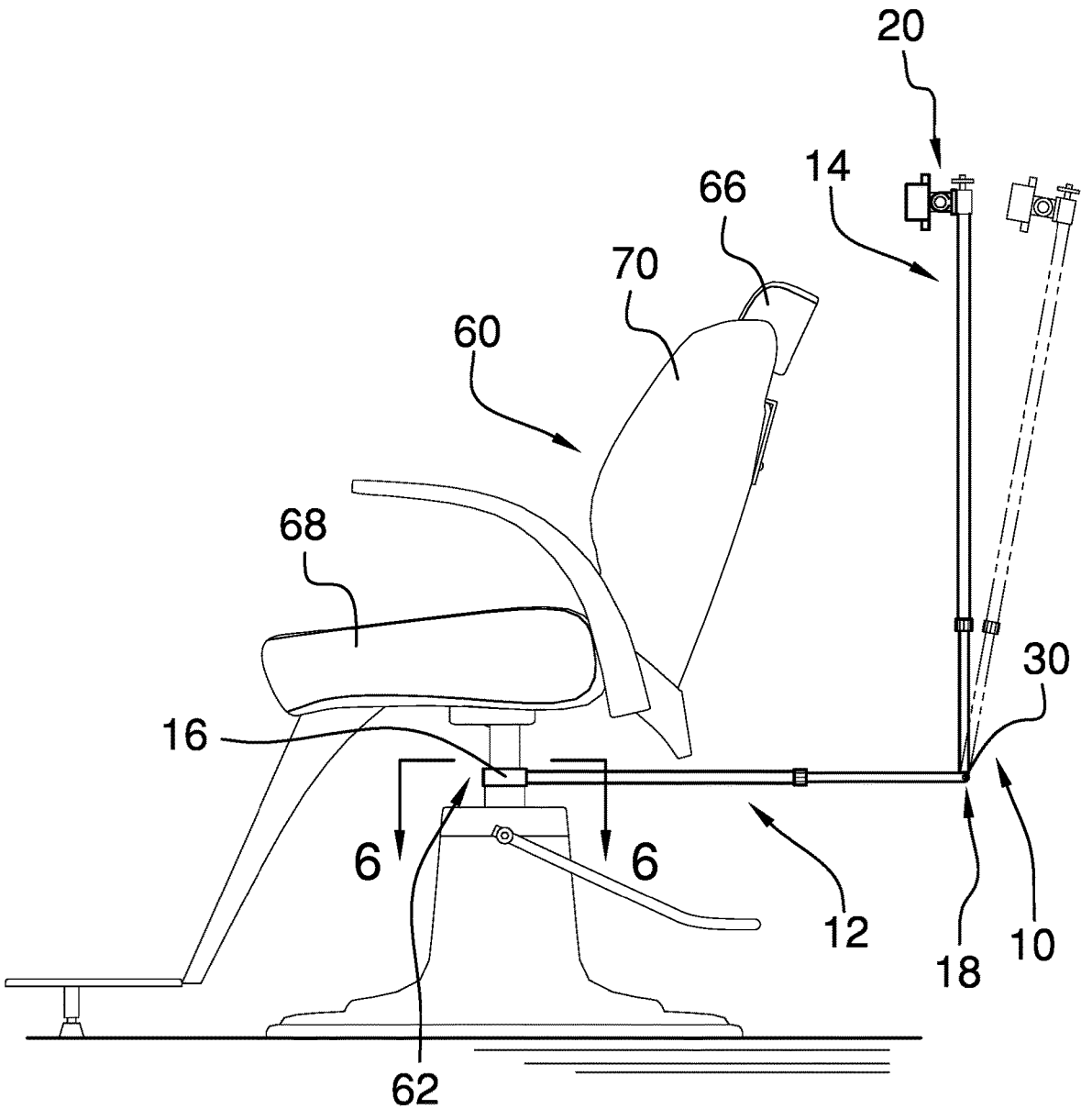
FIG. 1 is a side view of a video or image recorder support arrangement according to an embodiment of the disclosure in use.

With reference now to the drawings, and in particular to FIGS. 1 through 6 thereof, a new video or image recorder support arrangement embodying the principles and concepts of an embodiment of the disclosure and generally designated by the reference numeral 10 will be described.

Figure 3:
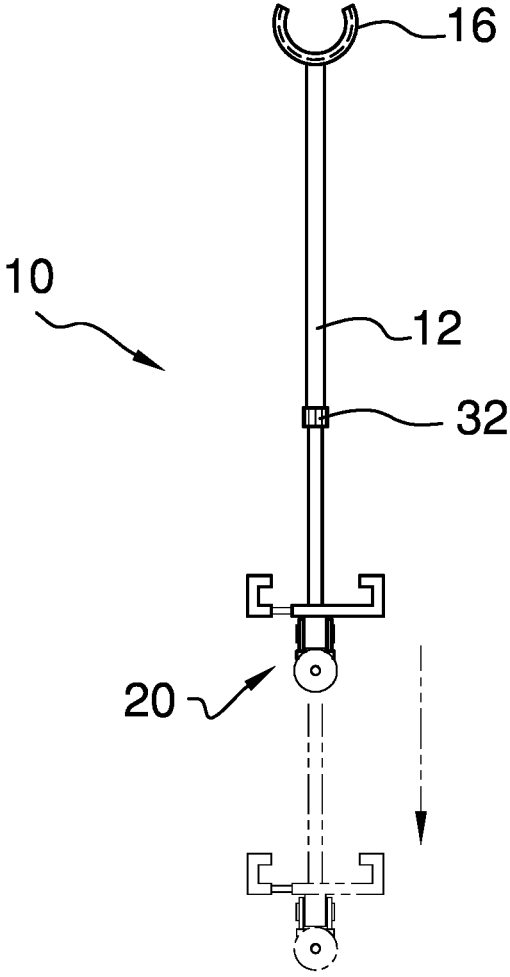
FIG. 3 is a top view of an embodiment of the disclosure.
Figure 4:
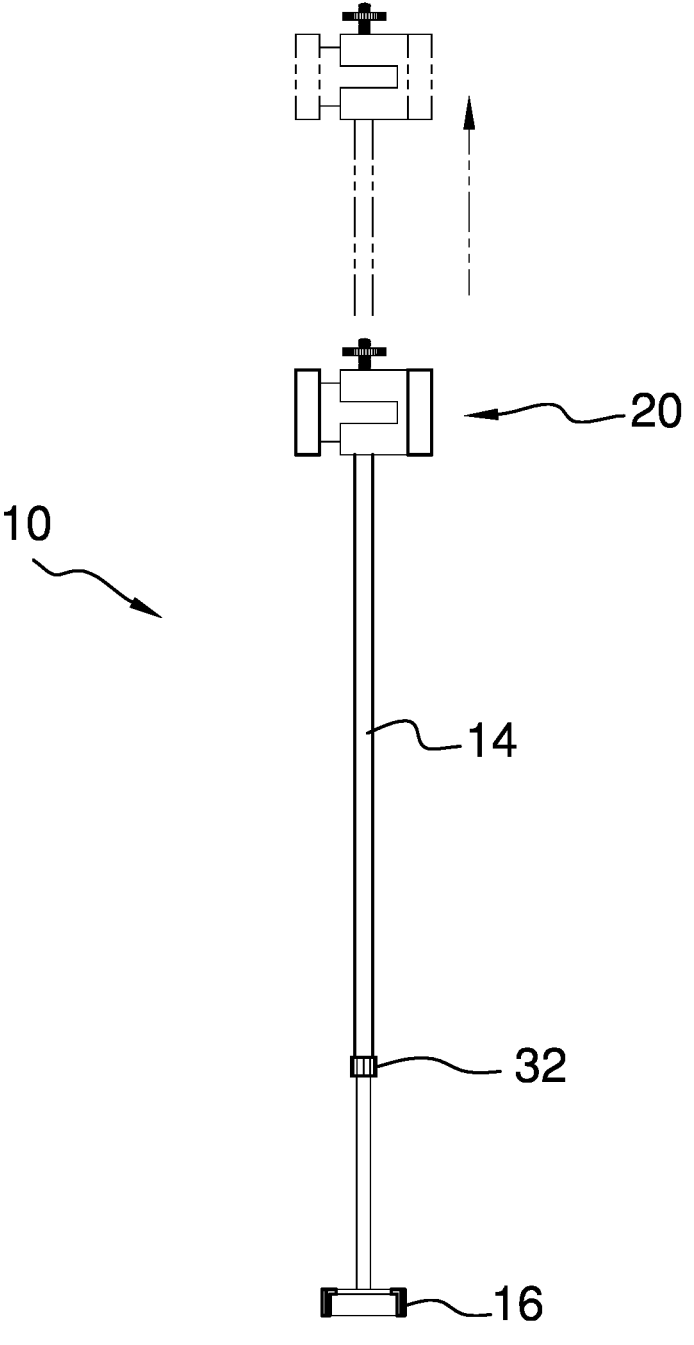
FIG. 4 is a front view of an embodiment of the disclosure.
Figure 5:
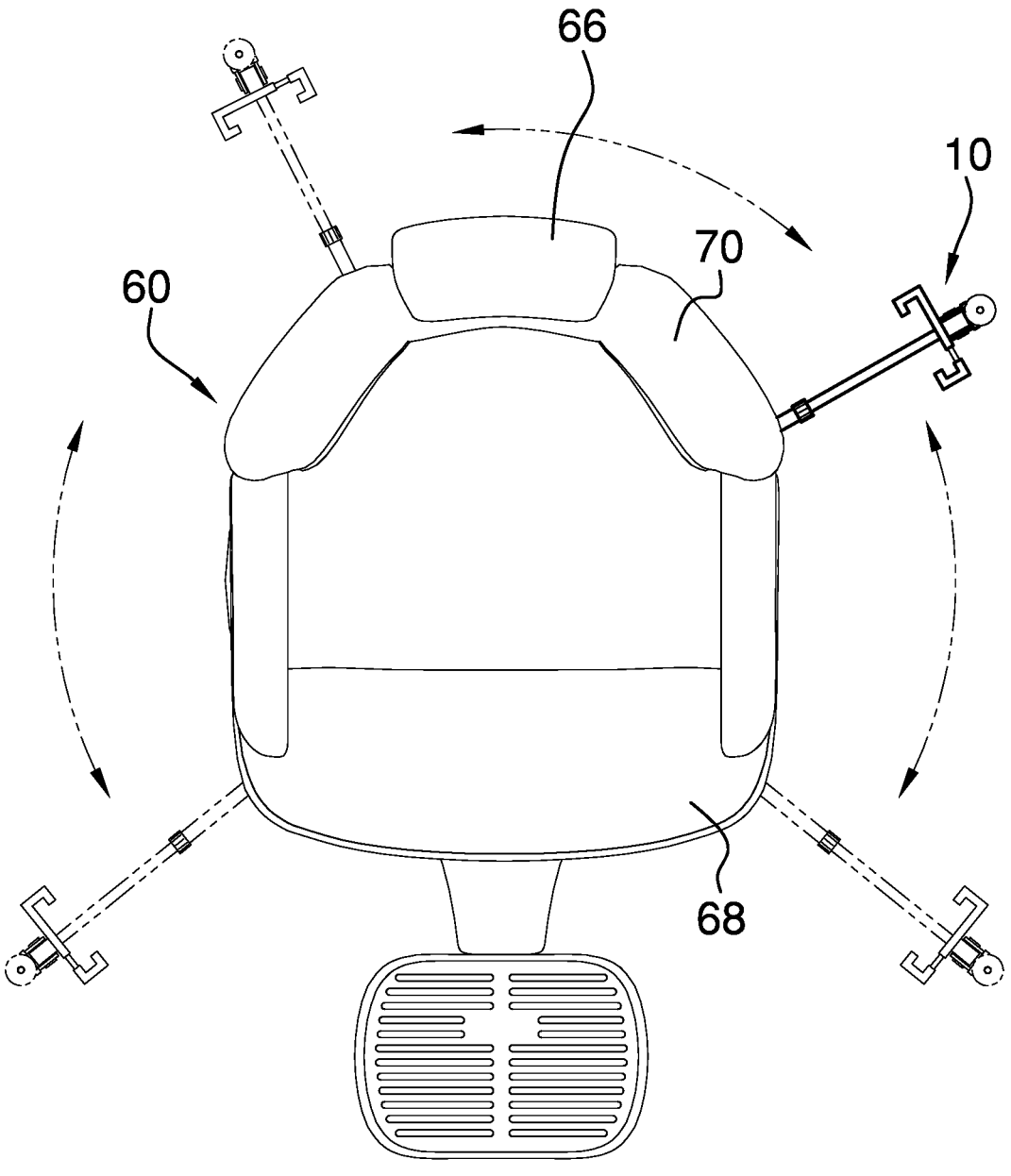
FIG. 5 is a top view of an embodiment of the disclosure in use.

As best illustrated in FIGS. 1 through 6, the video or image recorder support arrangement 10 generally comprises a horizontal arm structure 12, a vertical arm structure 14, a mounting structure 16, a connecting structure 18, and a holding arrangement 20. The horizontal arm structure 12 includes a first horizontal end portion 22 and a second horizontal end portion 24. The vertical arm structure 14 includes a first vertical end portion 26 and a second vertical end portion 28. The mounting structure 16 is positioned at the first horizontal end portion 22 and is designed to be detachably and rotatably connected to a support column 62 of a commercial chair 60, such as a hydraulic support of a barber chair or salon chair as shown in FIG. 1. The connecting structure 18 is designed and positioned to connect the second horizontal end portion 24 to the second vertical end portion 28 such that the vertical arm structure 14 extends upwardly from the horizontal arm structure 12 upon connection to the commercial chair 60. The holding arrangement 20 is positioned at the first vertical end portion 26 and is designed to support and hold a video or image recorder, such as a smart phone 64 or digital camera. The vertical arm structure 14 has a length sufficient to position the holding arrangement 20 adjacent a headrest 66 of the commercial chair 60 to permit a user to record video or images of the head of a customer or of a commercial process performed by the user on the customer. The horizontal arm structure 12 is positioned to extend essentially radially from a support column 62 of the commercial chair 60 and has a length sufficient to position the second horizontal end portion 24 to project beyond a seat 68 and a backrest 70 such that upon rotation of the mounting structure 16 about a support column 62 of the commercial chair 60 the vertical arm structure 14 is freely movable about the seat 68 and the backrest 70 of the commercial chair 60 to permit a user to record video or images of the head of a customer or of a commercial process performed by the user on the customer from different angles or viewpoints, as shown in FIG. 5.

In accordance with at least one possible embodiment, the connecting structure 18 includes an adjustable hinge 30 designed to permit adjustment and fixing of the angular positioning of the vertical arm structure 14 with respect to the horizontal arm structure 12 to an obtuse or acute angle, as shown in FIG. 1. This design allows the user to tilt the smartphone 64 or camera to record from different angles or record different parts of the customer's body depending on the work being done.

In accordance with at least one possible embodiment, the mounting structure 16 includes a C-shaped collar.

In accordance with at least one possible embodiment, each of the vertical arm structure 14 and the horizontal arm structure 12 includes two portions connected together in a telescoping manner and a locking ring 32 to permit adjustment of the overall length of each of the vertical arm structure 14 and the horizontal arm structure 12 by a user to adjust to commercial chairs of different sizes and configurations and customers of different heights and characteristics. The respective adjustments are shown in FIGS. 3 and 4.

Figure 2:
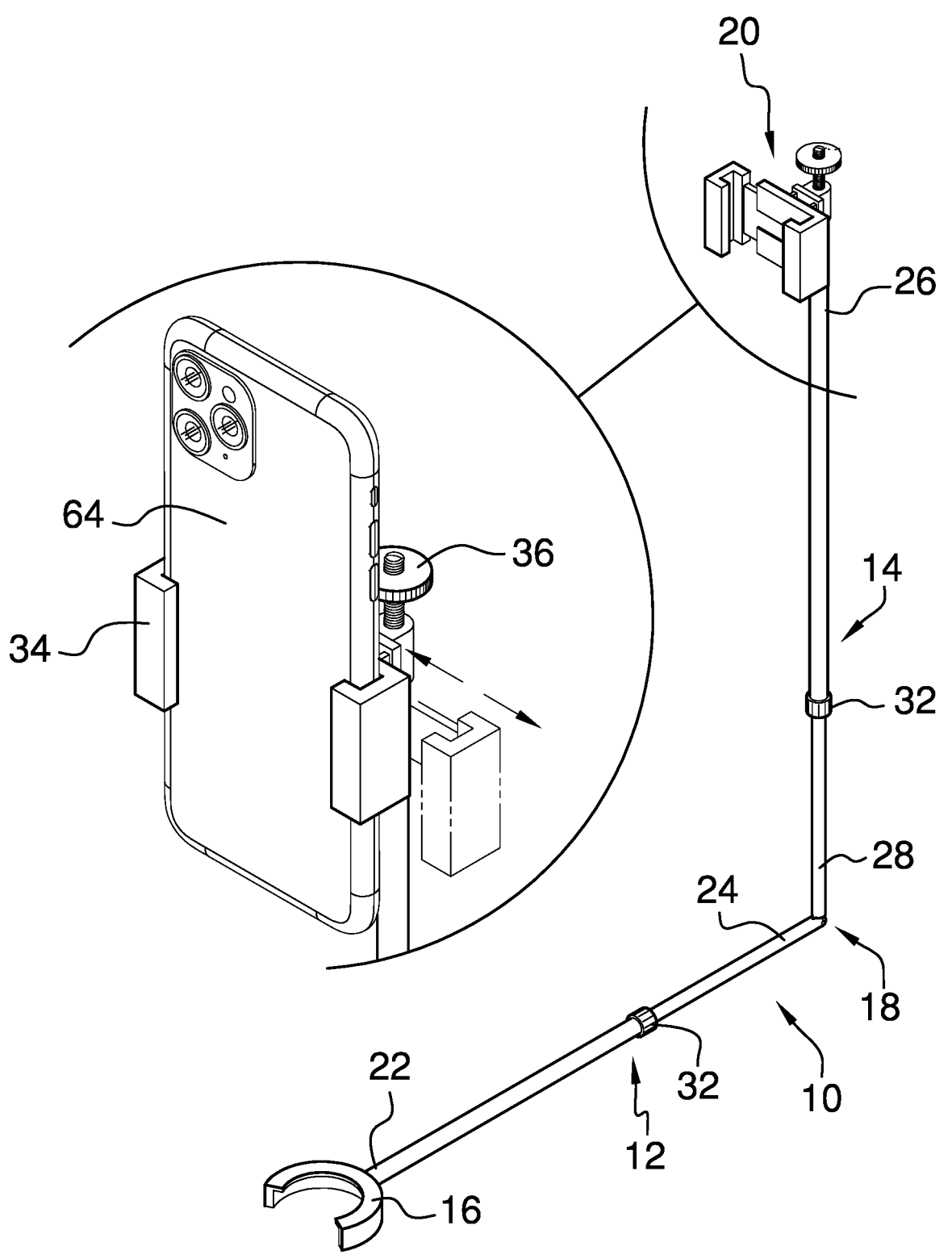
FIG. 2 is a perspective view of an embodiment of the disclosure.

In accordance with at least one possible embodiment, the holding arrangement 20 includes a smart phone holder 34 that is adjustable to permit holding of smart phones 64 of different dimensions, as shown in FIG. 2. In accordance with at least one possible embodiment, the holding arrangement 20 includes a digital camera mount 36 designed to support a digital camera.

In accordance with at least one possible embodiment, the mounting structure 16 is designed to be detachably connected to a hydraulic base of a barber or salon chair, such as is shown in FIG. 1, but in accordance with at least one possible embodiment, the mounting structure 16 could also be designed to be detachably connected to a medical or dental chair, a tattoo artist chair, or a make-up artist chair in a similar manner.

Figure 6:
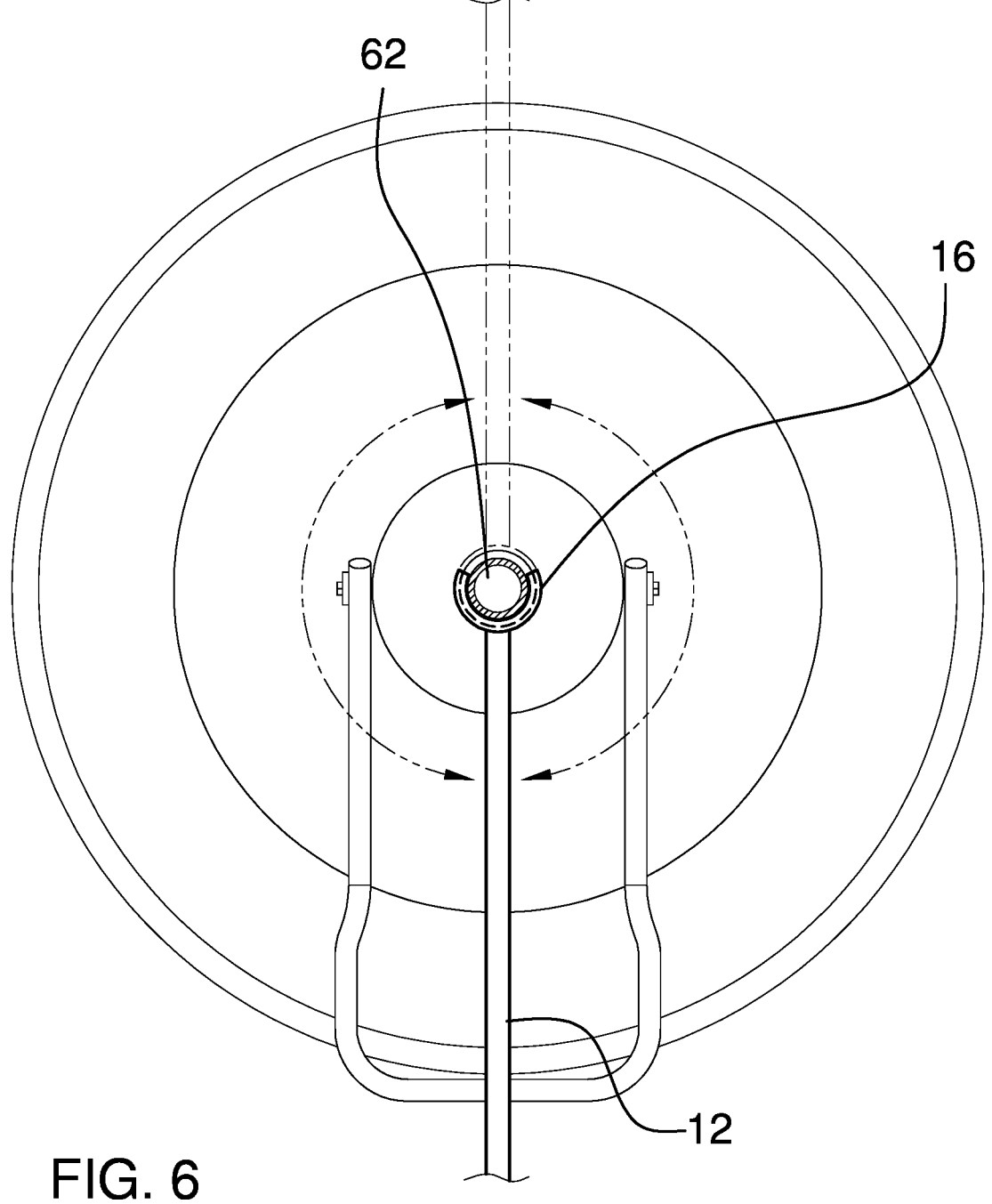
FIG. 6 is a close-up view of a portion of an embodiment of the disclosure in use.

FIG. 6 shows a view of a hydraulic lift or support of barber or salon chair with mounting structure 16 attached thereto to show how the mounting structure 16 can be rotated around the support column 62.

In use, the professional detachably connects the mounting structure 16 to a support column 62 of the commercial chair 60, which could be a barber or salon chair, a medical or dental chair, a tattoo artist chair, or a make-up artist chair. The professional places a video or image recorder, such as a smart phone 64 or digital camera, in the holding arrangement 20 and adjacent a headrest 66 of the commercial chair 60. The professional then performs a commercial process on the customer, such as cutting or styling hair or doing makeup. The professional can then record video or images of the head of a customer or of the commercial process at a first angle or viewpoint. The professional then can move the vertical arm structure 14 about a seat 68 and a backrest 70 of the commercial chair 60 and rotate the mounting structure 16 about the support column 62 to a different position and record video or images of the head of a customer or of the commercial process at a second angle or viewpoint different than the first angle or viewpoint. The video or image recorder support arrangement 10 allows professionals to make recordings or take pictures of their work from various angles and viewpoints in a hands-free manner.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A video or image recorder support arrangement for commercial chairs having a support column comprising:
    a horizontal arm structure comprising a first horizontal end portion and a second horizontal end portion;
    a vertical arm structure comprising a first vertical end portion and a second vertical end portion;
    a mounting structure being disposed at said first horizontal end portion and being configured to be detachably and rotatably connected to a support column of a commercial chair;

a connecting structure being configured and disposed to connect said second horizontal end portion to said second vertical end portion such that said vertical arm structure extends upwardly from said horizontal arm structure upon connection to a commercial chair;

a holding arrangement being disposed at said first vertical end portion and being configured to support and hold a video or image recorder;

said vertical arm structure having a length sufficient to dispose said holding arrangement adjacent a headrest of a commercial chair to permit a user to record video or images of the head of a customer or of a commercial process performed by the user on the customer;

said horizontal arm structure being disposed to extend essentially radially from a support column of a commercial chair and having a length sufficient to dispose said second horizontal end portion to project beyond a seat and backrest such that upon rotation of said mounting structure about a support column of a commercial chair said vertical arm structure being freely movable about a seat and a backrest of a commercial chair to permit a user to record video or images of the head of a customer or of a commercial process performed by the user on the customer from different angles or viewpoints;

wherein said connecting structure comprises an adjustable hinge configured to permit adjustment and fixing of the angular positioning of said vertical arm structure with respect to said horizontal arm structure to an obtuse or acute angle; and wherein said mounting structure comprises a C-shaped collar having a pair of oppositionally positioned and spaced free ends.

2. The video or image recorder support arrangement of claim 1, wherein said mounting structure is configured to be detachably connected to a hydraulic base of a barber or salon chair.

3. The video or image recorder support arrangement of claim 1, wherein said mounting structure is configured to be detachably connected to a commercial chair comprising a medical or dental chair, a tattoo artist chair, or a make-up artist chair.

4. The video or image recorder support arrangement of claim 1, wherein each of said vertical arm structure and said horizontal arm structure comprises two portions connected together in a telescoping manner and a locking ring to permit adjustment of the overall length of each of said vertical arm structure and said horizontal arm structure by a user to adjust to commercial chairs of different sizes and configurations and customers of different heights and characteristics.

5. The video or image recorder support arrangement of claim 4, wherein said holding arrangement comprises a smart phone holder that is adjustable to permit holding of smart phones of different dimensions.

6. The video or image recorder support arrangement of claim 5, wherein said holding arrangement comprises a digital camera mount configured to support a digital camera.

7. The video or image recorder support arrangement of claim 6, wherein said mounting structure is configured to be detachably connected to a hydraulic base of a barber or salon chair.

8. The video or image recorder support arrangement of claim 6, wherein said mounting structure is configured to be detachably connected to a commercial chair comprising a medical or dental chair, a tattoo artist chair, or a make-up artist chair.

9. The video or image recorder support arrangement of claim 1, wherein said holding arrangement comprises a smart phone holder that is adjustable to permit holding of smart phones of different dimensions.

10. The video or image recorder support arrangement of claim 1, wherein said holding arrangement comprises a digital camera mount configured to support a digital camera.

\* \* \* \* \*